(12) United States Patent
Hadden et al.

(10) Patent No.: US 6,324,379 B1
(45) Date of Patent: Nov. 27, 2001

(54) TRANSCEIVER SYSTEMS AND METHODS THAT PRESERVE FREQUENCY ORDER WHEN DOWNCONVERTING COMMUNICATION SIGNALS AND UPCONVERTING DATA SIGNALS

(75) Inventors: Ian Hadden, Camarillo; Ernesto Gold, Simi Valley, both of CA (US)

(73) Assignee: California Amplifier, Inc., Camarillo, CA (US)

( * ) Notice: Subject to any disclaimer, the term of this patent is extended or adjusted under 35 U.S.C. 154(b) by 0 days.

(21) Appl. No.: 09/086,088

(22) Filed: May 28, 1998

(51) Int. Cl.$^7$ .......................... H04H 01/00; H04B 01/40
(52) U.S. Cl. ...................... 455/3.01; 455/3.02; 455/84; 455/3.05
(58) Field of Search .................. 455/3.1, 3.2, 5.1, 455/6.1, 6.2, 6.3, 73, 84, 85, 86, 87, 3.01, 3.02, 3.05

(56) References Cited

U.S. PATENT DOCUMENTS

| | | |
|---|---|---|
| 5,163,160 * | 11/1992 | Foucher et al. ............... 455/87 X |
| 5,437,052 | 7/1995 | Hemmie et al. ............... 451/5.1 |
| 5,613,191 * | 3/1997 | Hylton et al. ............... 455/3.1 |
| 5,729,825 * | 3/1998 | Kostreski et al. ............... 455/3.1 |
| 5,844,939 * | 12/1998 | Scherer et al. ............... 455/84 X |

* cited by examiner

*Primary Examiner*—William Trost
*Assistant Examiner*—Philip J. Sobutka
(74) *Attorney, Agent, or Firm*—Koppel & Jacobs

(57) ABSTRACT

Full-duplex, coherent transceivers are provided which can directly interface between exisiting data interface modules (e.g., cable modems) and wireless cable providers to facilitate the flow of high-speed downlink communication signals and high-speed uplink data signals. Currently, a speed bottleneck is formed between consumers and various communication resources (e.g., the internet) by low transfer rates of telephones and conventional modems. This bottleneck is removed by transceivers of the invention. The transceiver structure prevents frequency inversion and reduces cost because it can form the required interface without requiring additional interface modules.

50 Claims, 5 Drawing Sheets

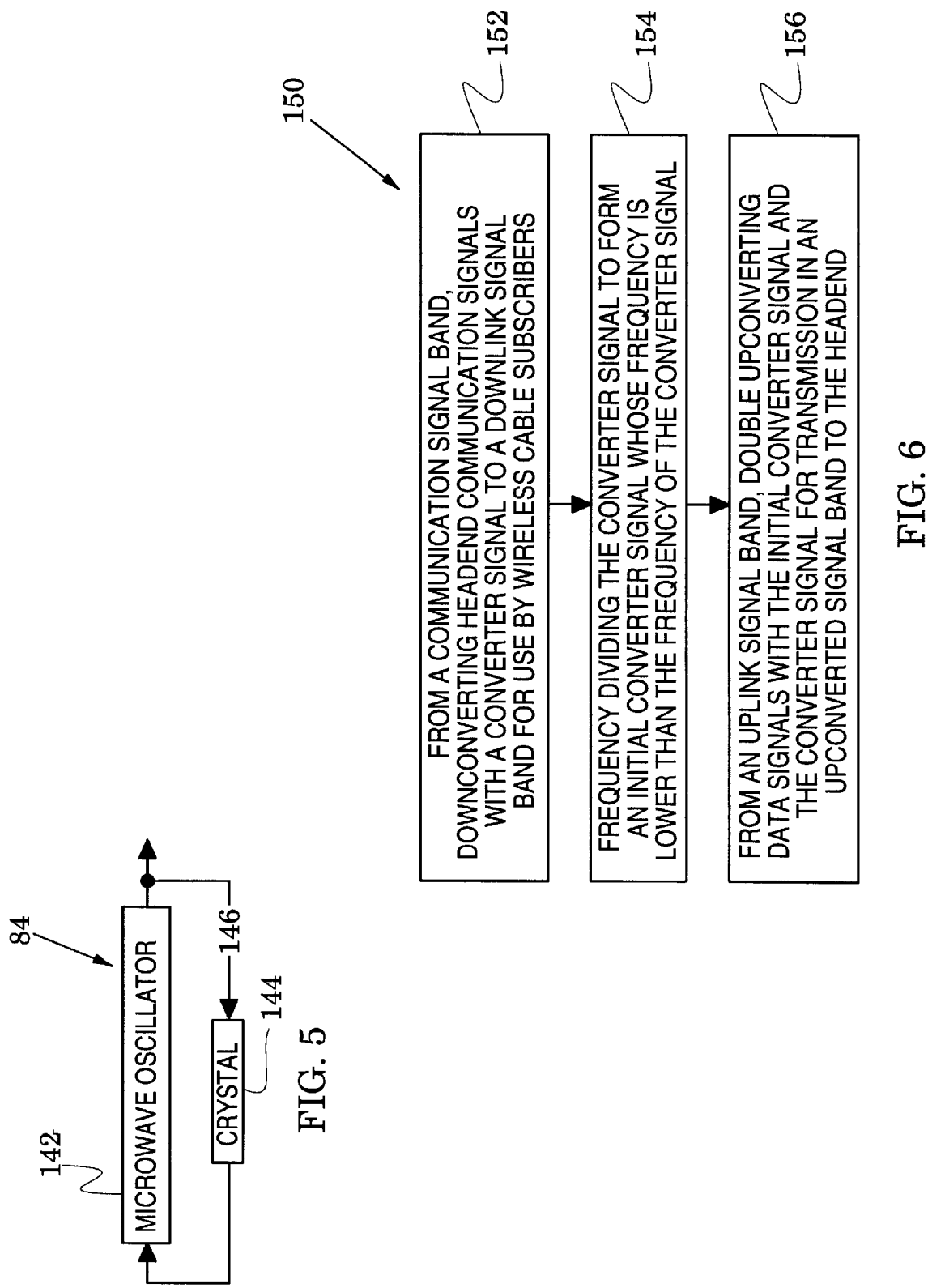

TRANSCEIVER SYSTEMS AND METHODS THAT PRESERVE FREQUENCY ORDER WHEN DOWNCONVERTING COMMUNICATION SIGNALS AND UPCONVERTING DATA SIGNALS

BACKGROUND OF THE INVENTION

1. Field of the Invention

The present invention relates generally to transceivers and more particularly to wireless cable transceivers.

2. Description of the Related Art

FIG. 1 illustrates signal bands that are associated with a variety of communication services that deliver communication signals to consumers. In the oldest of these communication services, off-air television and frequency modulation signals are received through a consumer antenna. Off-air television channels are arranged in three different signal bands that are included in a frequency span of 54–800 MHz and off-air frequency modulation signals extend across a signal band of 88–108 MHz. Subsequently, consumers were offered the alternative of cable television (CATV) in which hard cables deliver television and frequency modulation signals to consumer dwellings over a CATV signal band of 54–648 MHz. Off-air and CATV communication signals are, therefore, substantially contained within a consumer signal band 10 of FIG. 1 that spans 5–750 MHz.

Consumers can presently choose between an additional pair of communication services. In a first one of these services, communication signals are provided by a direct broadcast satellite (DBS) system. In this system, satellites radiate microwave signal beams in C-band frequencies (e.g., 3.7–4.2 GHz) and Ku-band frequencies (e.g., 11.7–12.75 GHz). Upon direct receipt at a consumer antenna, these satellite signals are initially downconverted to a signal band of 950–1450 MHz before further downconversion and detection at either 479 MHz or 70 MHz.

In a second one of these services, communication signals are provided by a wireless cable system in which signals are directed from a service provider's antenna to a plurality of subscriber antennas. The signals can be sent over two different wireless cable signal bands. One band is the multipoint distribution service (MDS) frequency band 11 of FIG. 1 that spans 2150–2162 MHz. The other band is the multichannel multipoint distribution service (MMDS) frequency band 12 that extends across 2500–2686 MHz. Signals in these wireless cable bands are typically downconverted at subscriber dwellings by low noise block downconverters (LNB's) that use a converter signal 13 at 2278 MHZ to form MDS and MMDS intermediate frequency bands 14 and 15 that respectively span 116–128 MHz and 222–408 MHz.

The communication signals provided by these consumer services were initially limited to television and frequency modulation signals. Consumers are now being offered, however, an increasing list of other communication options. For example, a communication service can operate as an internet service provider (ISP) who provides access to the internet. It was also initially envisioned that signals were only downlinked to consumers but some of these communication services have now become two-way streets in which consumers uplink data signals (e.g., signals associated with the activities of pay-for-view, banking, home shopping, medical alarm and fire/security).

In the past, uplink data from consumers has typically been channeled over telephone lines. As a first example, consumers communicate home shopping selections over their telephones to wireless cable providers. As a second example, consumer computers communicate through modems and telephone lines with internet ISP's. Telephone lines and conventional modems, however, form a speed bottleneck in these data communications because of their low transmission rates (typically less than 56 kbps).

To provide a path around this bottleneck, the signal band 10 of FIG. 1 is now generally divided into an uplink signal band 16 of 5–65 MHz for consumer uplinking of data signals and a downlink signal band 17 of 50–750 MHz for provider downlinking of communication signals. Recently introduced data interface modules (e.g., cable modems) take advantage of the higher uplink bandwidth. Accordingly, these modules have significantly higher data transmission rates (e.g., 500 kbps–3 Mbps).

The provider antenna-subscriber antenna structure of wireless cable is especially suited for two-way signal flow. As stated previously, communication signals from wireless cable headends are typically downconverted at subscriber dwellings by LNB's and subscriber data is presently communicated back to the headend by telephone lines which have the speed limitation referred to above. This data path limitation could be removed by provision of a high-speed uplink path. In anticipation of this, a pair of data-uplink signal bands have been proposed. One is a limited-bandwidth (2686.0625–2689.8125 MHz) instructional television fixed service (ITFS) signal band and the other is a wider-bandwidth (2305–2360 MHz) wireless communication service (WCS) signal band. These are respectively shown in FIG. 1 as signal bands 18A and 18B.

In an exemplary uplink path proposed in U.S. Pat. No. 5,437,052 (issued Jul. 25, 1995 to Hemmie, et al.), a bi-directional converter has a downconverter for downconverting MMDS programming signals (i.e., signals in the MMDS band 13 of FIG. 1) to converted signals in the 222–408 MHz range (i.e., intermediate frequency band 16 in FIG. 1) and an upconverter that converts data/information signals in the 116–128 MHz range (i.e., intermediate frequency band 15 in FIG. 1) to the MDS signal band (i.e., MDS band 12 in FIG. 1).

This proposed uplink path, however, ignores a frequency gap 19 between the uplink signal band 16 and the intermediate frequency MDS band 14 of FIG. 1. Subscribers wishing to access this uplink path with data interface modules that operate in the uplink signal band 16, would have to purchase additional interface modules that could span the frequency gap 19. In addition, if this upconversion structure is used to communicate data to the MDS band (11 in FIG. 1), it will invert the data's frequency order in contrast to the conventional MMDS downconversion process which does not invert frequency order. This inversion typically creates problems in communication and data transfer systems.

SUMMARY OF THE INVENTION

The present invention addresses full-duplex, coherent transceivers that can directly couple exiting data interface modules to wireless cable providers and thus establish a high-speed uplink path for subscriber data flow that complements an existing high-speed downlink path for communication signals.

In particular, such transceivers can directly couple data interface modules (e.g., cable modems) operating in the uplink and downlink signal bands 16 and 17 of FIG. 1 to wireless cable providers through signal bands at the providers' transmission antennas. With this direct interface, subscriber communication devices (e.g., computers, telephones and television displays) can be coupled in high-speed two-way paths with wireless cable providers (and, from there, to other resources such as the internet). Equipment to provide this two-way access is limited to the transceiver, a subscriber antenna and a hookup cable between the externally-positioned transceiver and communication devices inside the subscriber's dwelling. Subscribers are thus spared the cost of additional interface devices (e.g., devices that can span the frequency gap 19 of FIG. 1).

These goals are achieved with transceivers that position a downconverter mixer in a downconversion path and serially-arranged first and second upconverter mixers in an upconversion path. A stable signal source (e.g., a microwave oscillator phase-locked to a crystal) provides mixer signals to the downconverter mixer and the second upconverter mixer and a frequency divider couples the signal source and the first upconverter mixer.

Accordingly, all mixers convert with coherent signals and the phase coherency required for two-way flow of provider-subscriber signals (e.g., television, internet and telephony signals) is preserved. The division of the frequency divider can be chosen to place the upconverted data signals into selected microwave signal bands at a wireless cable transmission antenna (e.g., signal bands 11, 12, 18A and 18B of FIG. 1). In addition, the double upconversion facilitates the use of frequency plans which select or avoid frequency inversion. This feature of the invention also enhances its use in carrying provider-subscriber signals.

A downconverter input port and an upconverter output port can be coupled through a diplexer to a subscriber antenna or, alternatively, each coupled to a respective antenna.

Subscriber equipment cost is further reduced by integration of the transceiver and the subscriber antenna into a single unit. Additional cost reduction is obtained by coupling a primary supply voltage through the hookup cable to a power conditioner in the transceiver. This eliminates the need for expensive and bulky dc power conversion circuits in the transceiver.

The novel features of the invention are set forth with particularity in the appended claims. The invention will be best understood from the following description when read in conjunction with the accompanying drawings.

BRIEF DESCRIPTION OF THE DRAWINGS

FIG. 5 is a block diagram of an exemplary mixer signal source in the transceiver of FIG. 3A; and FIG. 6 is a flow chart which illustrates process steps in the transceiver of FIG. 3A and the wireless cable system of FIG. 2.

DETAILED DESCRIPTION OF THE PREFERRED EMBODIMENTS

Figure 2:
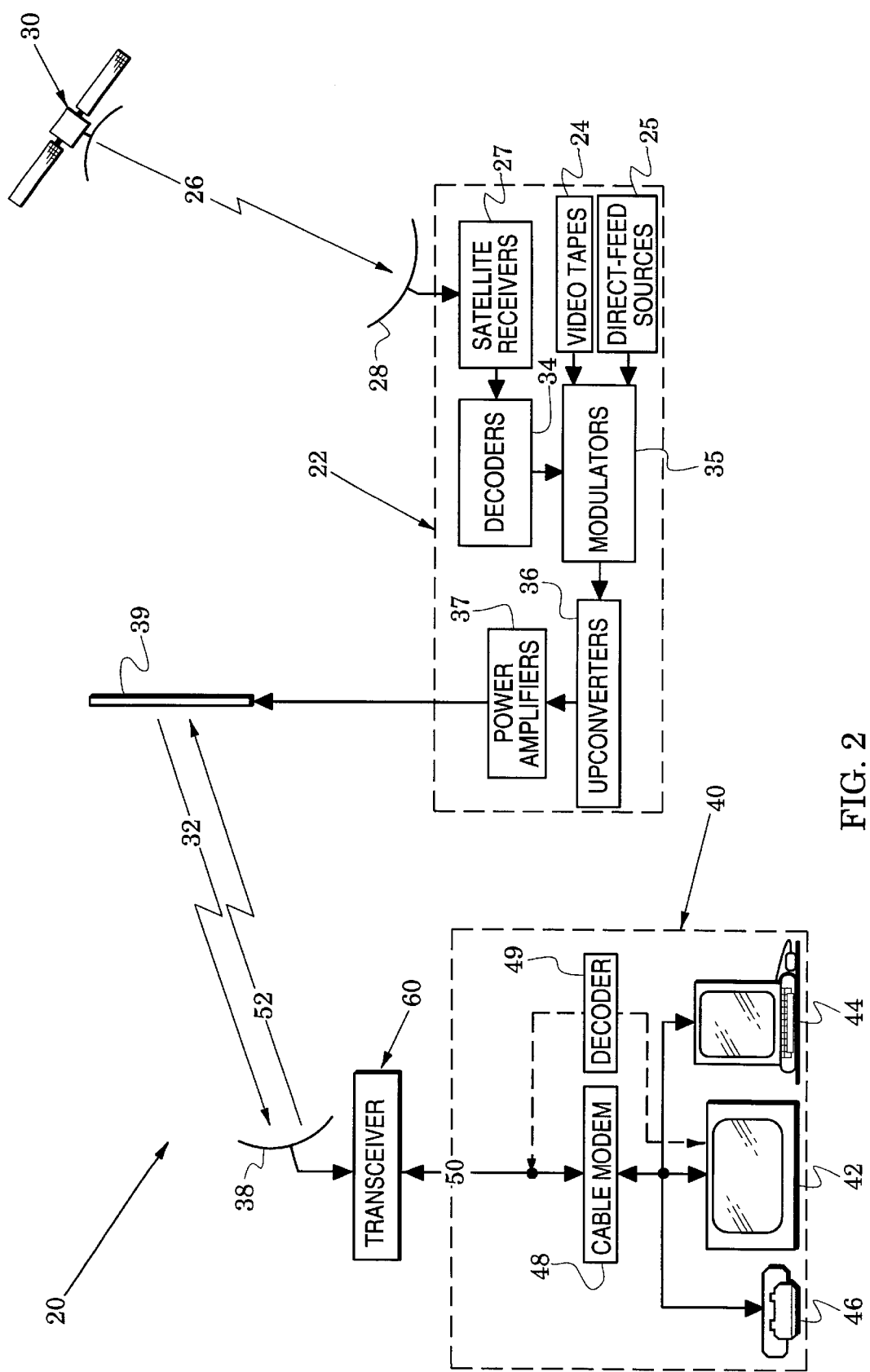
FIG. 2 is a block diagram of a wireless cable system in accordance with the present invention.

FIG. 2 illustrates a wireless cable system 20 of the present invention in which a wireless cable headend 22 receives programming inputs from a variety of sources. These sources may include video tapes 24, direct-feed sources 25 and transmissions 26 received via satellite receivers 27 and a receive antenna 28 from a broadcast satellite 30. From the programming sources, the headend 22 prepares communication signals 32 with various signal conditioning equipment (e.g., decoders 34, modulators 35, upconverters 36 and power amplifiers 37) and transmits the communication signals to a plurality of subscriber antennas 38 from a transmit antenna 39.

In an exemplary subscriber dwelling 40, various subscriber communication devices (e.g., television-display device 42, computer 44 and telephone 46) are coupled into a data interface module in the form of a cable modem 48. Other exemplary interface modules include an analog decoder 49 which would typically couple to an analog television set as indicated in broken lines. In the following description, it is assumed the data interface module is represented by the cable modem 48.

A hookup cable 50 connects the cable modem with an externally-positioned transceiver 60. The cable modem 48 is thus directly coupled through the transceiver 60 and the subscriber antenna 38 to thereby transmit data signals 52 to the headend's transmit antenna 39. Accordingly, a high-speed two-way flow of communication signals 32 and data signals 52 is established between subscribers and a wireless cable headend 22.

Figure 3A:
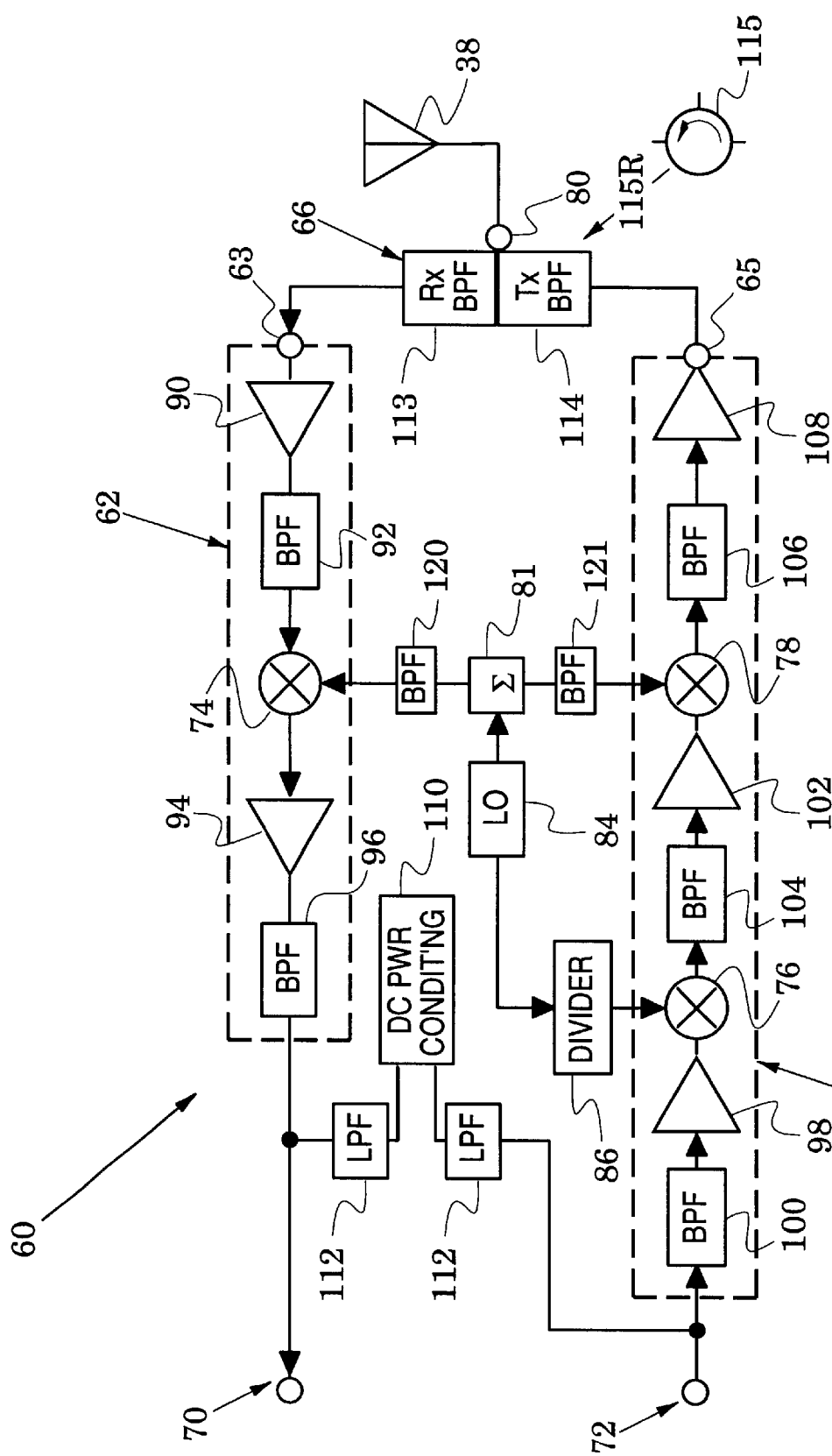
FIG. 3A is a block diagram of a full-duplex, coherent transceiver in the wireless cable system of FIG. 2.

In particular, the transceiver 60 is shown in FIG. 3A to include a frequency downconverter 62 and a frequency upconverter 64. The downconverter's input port 63 and the upconverter's output port 65 are coupled through a diplexer 66 to the subscriber antenna 38. The downconverter's output communication signals are available at a downconverter output port 70 for coupling through the hookup cable (50 in FIG. 2) to the cable modem (48 in FIG. 2). Data signals from the cable modem are coupled through the hookup cable to an upconverter input port 72.

The downconverter 62 has a mixer 74 between the diplexer 66 and the downconverter's output port 70 and the upconverter 64 has first and second mixers 76 and 78 that are serially arranged between the upconverter's input port 72 and the diplexer 66. The diplexer 66 has an input/output port 80 that couples to the antenna 38.

The output of a stable mixer signal source 84 is directly coupled through a signal divider 81 to the downconverter mixer 74 and the second upconverter mixer 78 and is coupled through a frequency divider 86 to the first upconverter mixer 76.

In more detail, the downconverter 62 positions a low-noise amplifier 90 and a radio-frequency (rf) bandpass filter 92 between the diplexer 66 and the downconverter's mixer 74. Although the low-noise amplifier 90 is positioned ahead of the bandpass filter 92 in FIG. 3A to enhance the downconverter's noise figure, other embodiments of the invention may reverse this arrangement to enhance filtering of image and intermediate frequency (if) signals. Between its mixer 74 and its output port 70, the downconverter includes a serially-arranged if amplifier 94 and an if bandpass filter 96.

Between its input port 72 and its first mixer 76, the upconverter 64 has a serially-arranged if amplifier 98 and an if bandpass filter 100. Similarly, the upconverter has a serially-arranged if amplifier 102 and an if bandpass filter 104 between its first and second mixers 76 and 78. Finally, a serially-arranged radio frequency (rf) bandpass filter 106 and rf amplifier 108 are arranged between the second upconverter mixer 78 and the diplexer 66. The rf filter 104 is preferably before the rf amplifier 106 to reduce unwanted mixing products (e.g., image and intermodulation signals) before they are amplified.

In addition, the transceiver 60 has a switched-mode DC power conditioning module 110 that can be coupled through a selected one of low-pass filters 112 to either of the downconverter output port 70 and the upconverter input port 72. A primary DC voltage can therefore be generated elsewhere (e.g., the cable modem 48 of FIG. 2) and coupled into the transceiver where the power conditioning module uses it to form biasing voltages for the transceiver. This feature of the invention lowers the transceiver's power dissipation and increases its efficiency.

In one embodiment, the transceiver's diplexer 66 is formed with a receive filter 113 that couples the input/output port 80 to the downconverter's input port 63 and a transmit filter 114 that couples the upconverter's output port 65 to the input/output port 80. The receive filter is configured to pass microwave signals in a communication signal band from the input/output port 80 to the downconverter input port 63. Similarly, the transmit filter is configured to pass microwave signals in an upconverted signal band from the input/output port 80 to the antenna 38. Various other conventional diplexer structures can be substituted. In another diplexer embodiment, for example, the filters 113 and 114 are replaced by an isolator 115 as indicated by the replacement arrow 115R.

Figure 3B:
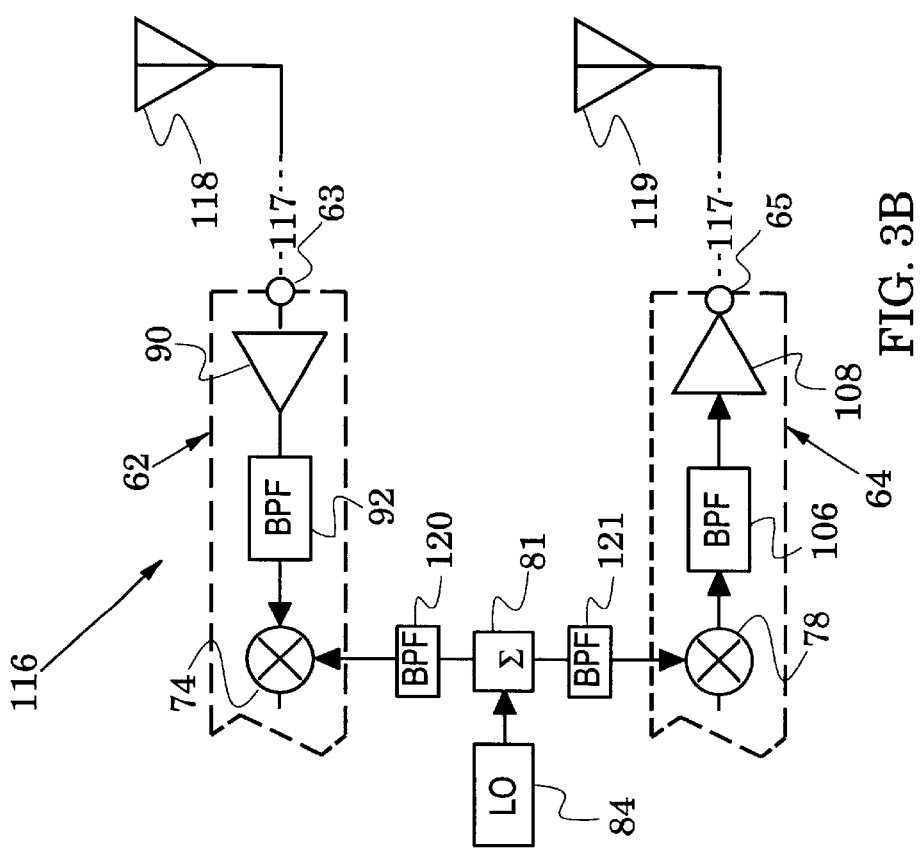
FIG. 3B is a partial block diagram which is similar to FIG. 3A but shows variations of another full-duplex, coherent transceiver embodiment.

FIG. 3B shows a partial block diagram of another transceiver embodiment 116 which is similar to the transceiver 60 with like elements indicated by like reference numbers. In the transceiver 60, the downconverter input port 63 and the upconverter output port 65 are coupled through a diplexer 66 to a subscriber antenna 38. In contrast, these ports are available for other connections in the transceiver 116. For example, the downconverter input port 63 and the upconverter output port 65 can be respectively coupled along signal paths 117 to a receive antenna 118 and a transmit antenna 119.

To reduce crosstalk between the frequency downconverter 62 and the frequency upconverter 64, the transceiver 60 of FIG. 3A preferably includes bandpass filters 120 and 121. Filter 120 is arranged to couple the signal of the signal source 84 to downconverter mixer 74 and filter 121 is arranged to couple the signal to upconverter mixer 78.

Figure 4:
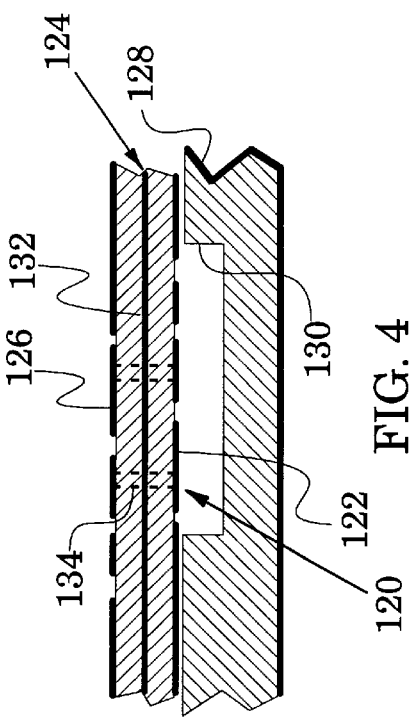
FIG. 4 is a cross sectional view through filters in the transceiver of FIG. 3A.

Each of these filters passes only the signal source's signal and is preferably received and isolated by a cavity in the transceiver's frame. This structure reduces the transceiver's size while also enhancing signal isolation. It is exemplified in FIG. 4 where the filter 120 is formed by microwave transmission lines 122 on the underside of a microwave circuit board 124. Other microwave circuits of the transceiver are formed by microwave transmission lines 126 on the upper side of the circuit board.

A transceiver frame 128 defines a cavity 130 which surrounds and isolates the filter 120 (for clarity of illustration, the frame is slightly spaced from the circuit board). The microwave transmission lines can be any of several conventional transmission lines (e.g., microstrip, slot line and coplanar waveguide). The lines 122 and 126 are preferably separated by a ground plane 132 and signal connections between the lines are formed by via holes 134.

FIG. 5 shows that an exemplary stable mixer signal source 84 is formed with a microwave oscillator 142. The oscillator is phase locked to a crystal 144 that is contained within a control loop 146. This forms a highly stable crystal-controlled signal source which enhances the phase coherence of the transceiver 60.

Basic operation of the transceiver 60 of FIG. 3A and the system 20 of FIG. 2 is shown in process steps of the flow chart 150 of FIG. 6. In a process step 152, headend communication signals (communication path 32 in FIG. 2) in a communications signal band (e.g., MMDS band 12 in FIG. 1) are downconverted with a converter signal (output of the signal source 84 in FIG. 3A) to a downlink signal band (e.g., signal band 15 in FIG. 1) for use by wireless cable subscribers. In FIG. 2, this downlink signal band is accessed by the cable modem 48.

Figure 1:
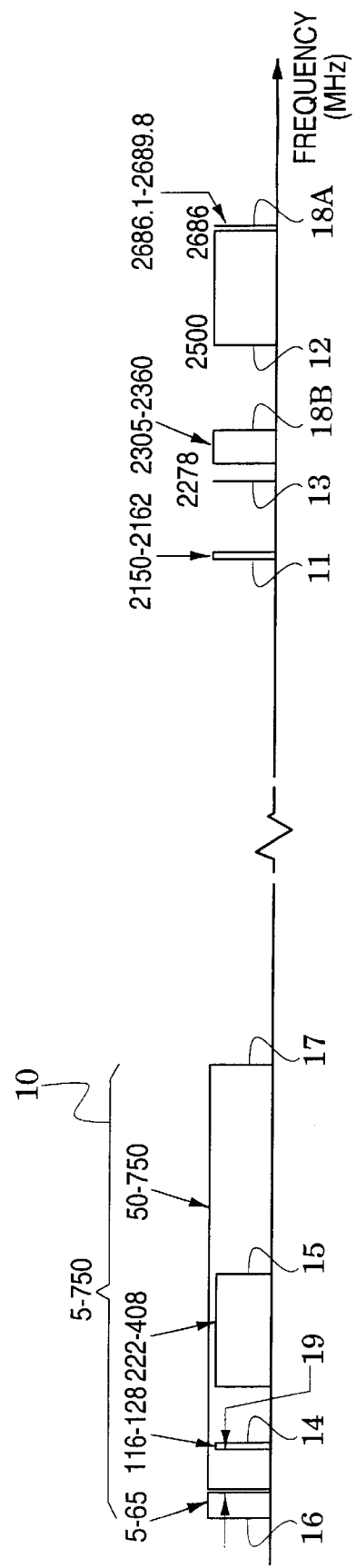
FIG. 1 is a diagram of frequency bands that are associated with existing communication services.

In process step 154, the converter signal is divided (by divider 86 in FIG. 3A) to form a lower-frequency initial converter signal. In process step 156, data signals from an uplink signal band (e.g., uplink band 16 in FIG. 1 provided by the cable modem 48 in FIG. 2) are double upconverted (in mixers 76 and 78 of FIG. 3A) with the initial converter signal and the converter signal to form signals in an upconverted signal band (e.g., a selected one of the signal bands 11, 12, 18A and 18B in FIG. 1). These upconverted signals are transmitted to the wireless cable headend (data path 52 in FIG. 2).

In its operation, the transceiver thus downconverts and upconverts with stable and phase coherent mixing signals to preserve phase coherency between the communication and data paths 32 and 52 of FIG. 2. Because of its double upconversion, the transceiver can directly interface between the cable modem (48 in FIG. 2) and the headend (22 in FIG. 2) without requiring any additional interface modules.

In the absence of the first upconverter mixer 76, a data signal band at the upconverter input port 72 would be frequency inverted by the upconversion process of the second mixer 78. With double upconversion, however, frequency inversion can be selected or avoided and, accordingly, frequency order preserved in both of the downconversion and upconversion processes of the transceiver 60.

By choice of the divider ratio in the frequency divider 86 of FIG. 3A, the upconverted signal band can be adjusted to match any selected one of various wireless cable signal bands. As a first example, with the signal source 84 generating a 2278 MHz signal and the divider 86 set to a divider ratio of 16, the first upconverter mixer 76 is supplied with a ~142.4 MHz drive signal. In this example, input data signals at input port 72 in the approximate range of 14.37–26.37 MHz will be upconverted (with difference frequencies selected by the bandpass filters 104 and 106) at the output port 65 to the MDS frequency band (11 in FIG. 1) that spans 2150–2162 MHz.

In FIG. 2, data can be therefore be sent directly from the uplink signal band (16 in FIG. 1) through the cable modem 48 to the headend 22 without the need for any interface modules and without frequency inversion. Simultaneously, communication signals in the MMDS band of 2500–2686 MHz (band 12 in FIG. 1) can be downconverted to an MMDS intermediate frequency band of 222–408 MHz (band 15 in FIG. 1).

As a second example, with the signal source 84 generating a 2143 MHz signal and the divider 86 again set to a divider ratio of 16, the first upconverter mixer 76 is supplied with a ~133.94 MHz drive signal. In this second example, input data signals at input port 72 in the approximate range of 28.06–43.06 MHz will be upconverted (with sum frequencies selected by the bandpass filters 104 and 106) at the output port 65 to a lower frequency portion 2305–2320 MHz of the WCS band 18B of FIG. 1.

In FIG. 2, data can again be sent directly from the uplink signal band (16 in FIG. 1) through the cable modem 48 to the headend 22 without the need for any interface modules and without frequency inversion. Simultaneously, communication signals in the MMDS band of 2500–2686 MHz (band 12 in FIG. 1) can be downconverted to an MMDS intermediate frequency band of 357–643 MHz.

In other exemplary applications of the transceivers of the invention, the divider ratio of the frequency divider 86 can be set to other conventional divider ratios (e.g., 2, 4 and 8) to facilitate coupling between a variety of communication and data signal bands (e.g., the WCS signal band (18B in FIG. 1), an Industrial, Scientific and Medical (ISM) band of 2400–2483.5 MHz and a Personal Communication Services (PCS) band of 1850–1990 MHz).

The downconverter port (70 in FIG. 3A) and upconverter port (72 in FIG. 3A) can be connected to the cable modem with double microwave cables or, preferably, with any of various microwave two-path cables (e.g., a microwave tri-axial cable). Alternatively, ports 70 and 72 can be coupled to external circuits through a diplexer similar to the diplexer 66.

The teachings of the invention facilitate enhanced data transfer rates because they provide direct coupling of dow ed communication signals and uplinked data signals between wireless cable subscribers and providers. Although these teachings have been illustrated with reference to a cable modem (48 in FIG. 2), other data interface modules can be used in practicing the invention.

The preferred embodiments of the invention described herein are exemplary and numerous modifications, variations and rearrangements can be readily envisioned to achieve an equivalent result, all of which are intended to be embraced within the spirit and scope of the invention as defined in the appended claims.

What is claimed is:

1. A full-duplex, coherent transceiver that provides a direct interface for a communication signal band and a data signal band in wireless cable systems, comprising:
    a frequency downconverter having a downconverter mixer coupled between a downconverter input port and a downconverter output port;
    a frequency upconverter having first and second upconverter mixers serially arranged between an upconverter input port and an upconverter output port;
    a mixer signal source coupled to said downconverter mixer and to said second upconverter mixer; and
    a frequency divider that couples said mixer signal source to said first upconverter mixer;
    and further including:
        first and second bandpass filters which couple said signal source respectively to said downconverter mixer and said second upconverter mixer;
        a microwave circuit board having first and second sides wherein at least portions of said downconverter and said upconverter are formed in microwave transmission lines on said first side and said first and second filters are formed with microwave transmission lines on said second side;
        a plurality of via holes coupling said first and second filters through said circuit board to said downconverter and said upconverter respectively; and
        a frame carrying said circuit board and defining first and second cavities which respectively receive and isolate said first and second filters;
        coherent signals from said mixer signal source thereby downconverting communication signals received in said communication signal band at said downconverter input port and double upconverting data signals received at said upconverter input port to said data signal band.

2. The transceiver of claim 1, wherein said diplexer includes:
    a receive filter configured to pass microwave signals in said communication signal band from said input/output port to said downconverter input; and
    a transmit filter configured to pass upconverted data signals in said upconverted signal band from said upconverter output to said input/output port.

3. The transceiver of claim 2, wherein said diplexer includes:
    a receive filter configured to pass said communication signals in said communication signal band from said input/output port to said downconverter input port; and
    a transmit filter configured to pass said data signals in said data signal band from said upconverter output port to said input/output port.

4. The transceiver of claim 1, further including:
    a microwave circuit board having first and second sides wherein at least portions of said downconverter and said upconverter are formed in microwave transmission lines on said first side and said diplexer is formed with microwave transmission lines on said second side;
    a plurality of via holes coupling said diplexer through said circuit board to said downconverter and said upconverter; and
    a frame carrying said circuit board and defining at least one cavity which receives and isolates at least one of the receive and transmit filters of said diplexer.

5. The transceiver of claim 1, further including:
    a low-pass filter coupled to one of said downconverter output port and said upconverter input port for reception of a primary supply voltage; and
    a power conditioning circuit coupled to said low pass filter for filtering and conversion of said primary supply voltage to at least one secondary supply voltage wherein operation of said transceiver is facilitated with said primary and secondary supply voltages.

6. The transceiver of claim 1, wherein said communication signal band is included in a multichannel multipoint distribution service (MMDS) frequency band of 2500–2686 MHz.

7. The transceiver of claim 1, wherein said mixer signal source has a frequency of 2278 MHz.

8. The transceiver of claim 1, wherein said data signal band is a frequency band of 5–45 MHz.

9. The transceiver of claim 1, wherein said upconverted signal band has a frequency of 2305–2360 MHz.

10. The transceiver of claim 1, wherein said upconverted signal band is included in a multichannel multipoint distribution service (MMDS) frequency band of 2500–2686 MHz.

11. The system of claim 10, wherein said data interface module is a cable modem.

12. The transceiver of claim 1, wherein said upconverted signal band is a multipoint distribution service (MDS) frequency band of 2150–2162 MHz.

13. The transceiver of claim 1, wherein:
    said frequency downconverter further includes:
        a low-noise amplifier and an rf bandpass filter serially coupled between said downconverter input and said downconverter mixer; and
        an if amplifier and an if bandpass filter serially coupled between said downconverter mixer and said downconverter output port; and said frequency upconverter includes:
  an if amplifier and an if bandpass filter serially coupled between said upconverter input port and said first upconverter mixer;
  an if amplifier and an if bandpass filter serially coupled between said first and said second upconverter mixers; and
  an rf amplifier and an rf bandpass filter serially coupled between said second upconverter mixer and said upconverter output.

14. A full-duplex, coherent transceiver that provides a direct interface for a communication signal band and a data signal band in wireless cable systems, comprising:
  a frequency downconverter having a downconverter mixer coupled between a downconverter input port and a downconverter output port;
  a frequency upconverter having first and second upconverter mixers serially arranged between an upconverter input port and an upconverter output port;
  a mixer signal source coupled to said downconverter mixer and to said second upconverter mixer; and
  a frequency divider that couples said mixer signal source to said first upconverter mixer;
  and further including:
    a low-pass filter coupled to at least one of said downconverter output port and said upconverter input port for reception of a primary supply voltage; and
    a power conditioning circuit coupled to said low pass filter for filtering and conversion of said primary supply voltage to at least one biasing voltage of said transceiver;
    coherent signals from said mixer signal source thereby downconverting communication signals received in said communication signal band at said downconverter input port and double upconverting data signals received at said upconverter input port to said data signal band.

15. The transceiver of claim 14, further including:
  a low-pass filter coupled to one of said downconverter output port and said upconverter input port for reception of a primary supply voltage; and
  a power conditioning circuit coupled to said low pass filter for filtering and conversion of said primary supply voltage to at least on secondary supply voltage wherein operation of said transceiver is facilitated with said primary and secondary supply voltages.

16. The transceiver of claim 14, wherein said communication signal band is included in a multichannel multipoint distribution service (MMDS) frequency band of 2500–2686 MHz.

17. The transceiver of claim 14, wherein said mixer signal source has a frequency of 2278 MHz.

18. The transceiver of claim 14, wherein said data signal band is a frequency band of 5–45 MHz.

19. The transceiver of claim 14, wherein said upconverted signal band has a frequency of 2305–2360 MHz.

20. The transceiver of claim 14, wherein said upconverted signal band is included in a multichannel multipoint distribution service (MMDS) frequency band of 2500–2686 MHz.

21. The transceiver of claim 14, wherein said upconverted signal band is a multipoint distribution service (MDS) frequency band of 2150–2162 MHz.

22. The transceiver of claim 14, wherein:
  said frequency downconverter further includes:
    a low-noise amplifier and an rf bandpass filter serially coupled between said downconverter input and said downconverter mixer; and
    an if amplifier and an if bandpass filter serially coupled between said downconverter mixer and said downconverter output port; and
  said frequency upconverter includes:
    an if amplifier and an if bandpass filter serially coupled between said upconverter input port and said first upconverter mixer;
    an if amplifier and an if bandpass filter serially coupled between said first and said second upconverter mixers; and
    an rf amplifier and an rf bandpass filter serially coupled between said second upconverter mixer and said upconverter output.

23. The transceiver of claim 14, wherein said diplexer includes:
  a receive filter configured to pass microwave signals in said communication signal band from said input/output port to said downconverter input; and
  a transmit filter configured to pass upconverted data signals in said upconverted signal band from said upconverter output to said input/output port.

24. The transceiver of claim 14, further including:
  a microwave circuit board having first and second sides wherein at least portions of said downconverter and said upconverter are formed in microwave transmission lines on said first side and said diplexer is formed with microwave transmission lines on said second side;
  a plurality of via holes coupling said diplexer through said circuit board to said downconverter and said upconverter; and
  a frame carrying said circuit board and defining at least one cavity which receives and isolates at least one of the receive and transmit filters of said diplexer.

25. The transceiver of claim 24, wherein said microwave transmission lines are microstrip transmission lines.

26. A wireless cable subscriber system for integration into a subscriber's dwelling, comprising:
  a microwave antenna for positioning external to said dwelling;
  a data interface module for positioning internal to said dwelling and configured to downlink communication signals and uplink data signals;
  a full-duplex, coherent transceiver for positioning adjacent to said antenna for direct interface between said data interface module and said antenna with said transceiver including:
    a) a frequency downconverter having a downconverter mixer coupled between a downconverter input and a downconverter output port;
    b) a frequency upconverter having first and second upconverter mixers serially arranged between an upconverter input port and an upconverter output;
    c) a diplexer coupled to said downconverter input and said upconverter output and having an input/output port configured for integration with said antenna;
    d) a mixer signal source coupled to said downconverter mixer and to said second upconverter mixer;
    e) a frequency divider that couples said mixer signal source to said first upconverter mixer;
    f) first and second bandpass filters which couple said signal source respectively to said downconverter mixer and said second upconverter mixer;
    g) a microwave circuit board having first and second sides wherein at least portions of said downconverter and said upconverter are formed in microwave transmission lines on said first side and first and second filters are formed with microwave transmission lines on said second side;

h) a plurality of via holes coupling said first and second filters through said circuit board to said downconverter and said upconverter respectively; and i) a frame carrying said circuit board and defining first and second cavities which respectively receive and isolate said first and second filters; and a cable for coupling said data interface module to said downconverter output port and said upconverter input port;

coherent signals from said mixer signal source thereby downconverting microwave signals received in a communication signal band from said antenna at said input/output port and double upconverting data signals received in a data signal band from said data interface module at said upconverter input port.

27. The transceiver of claim 26, further including:

a low-pass filter coupled to one of said downconverter output port and said upconverter input port for reception of a primary supply voltage; and a power conditioning circuit coupled to said low pass filter for filtering and conversion of said primary supply voltage to at least one secondary supply voltage wherein operation of said transceiver is facilitated with said primary and secondary supply voltages.

28. The transceiver of claim 26, wherein said communication signal band is included in a multichannel multipoint distribution service (MMDS) frequency band of 2500–2686 MHz.

29. The transceiver of claim 26, wherein said mixer signal source has a frequency of 2278 MHz.

30. The transceiver of claim 26, wherein said data signal band is a frequency band of 5–45 MHz.

31. The transceiver of claim 26, wherein said upconverted signal band has a frequency of 2305–2360 MHz.

32. The transceiver of claim 26, wherein said upconverted signal band is included in a multichannel multipoint distribution service (MMDS) frequency band of 2500–2686 MHz.

33. The transceiver of claim 26, wherein said upconverted signal band is a multipoint distribution service (MDS) frequency band of 2150–2162 MHz.

34. The transceiver of claim 26, wherein:

said frequency downconverter further includes:

a low-noise amplifier and an rf bandpass filter serially coupled between said downconverter input and said downconverter mixer; and an if amplifier and an if bandpass filter serially coupled between said downconverter mixer and said downconverter output port; and said frequency upconverter includes:

an if amplifier and an if bandpass filter serially coupled between said upconverter input port and said first upconverter mixer;

an if amplifier and an if bandpass filter serially coupled between said first and said second upconverter mixers; and an rf amplifier and an rf bandpass filter serially coupled between said second upconverter mixer and said upconverter output.

35. The transceiver of claim 26, wherein said diplexer includes:

a receive filter configured to pass microwave signals in said communication signal band from said input/output port to said downconverter input; and a transmit filter configured to pass upconverted data signals in sad upconverted signal band from said upconverter output to said input/output port.

36. The transceiver of claim 26, further including:

a microwave circuit board having first and second sides wherein at least portions of said downconverter and said upconverter are formed in microwave transmission lines on said first side and said diplexer is formed with microwave transmission lines on said second side;

a plurality of via holes coupling said diplexer through said circuit board to said downconverter and said upconverter; and a frame carrying said circuit board and defining at least one cavity which receives and isolates at least one of the receive and transmit filters of said diplexer.

37. The transceiver of claim 36, wherein said microwave transmission lines are microstrip transmission lines.

38. A wireless cable subscriber system for integration into a subscriber's dwelling, comprising:

a microwave antenna for positioning external to said dwelling;

a data interface module for positioning internal to said dwelling and configured to downlink communication signals and uplink data signals;

a full-duplex, coherent transceiver for positioning adjacent to said antenna for direct interface between said data interface module and said antenna with said transceiver including:

a) a frequency downconverter having a downconverter mixer coupled between a downconverter input and a downconverter output port;

b) a frequency upconverter having first and second upconverter mixers serially arranged between an upconverter input port and an upconverter output;

c) a diplexer coupled to said downconverter input and said upconverter output and having an input/output port configured for integration with said antenna;

d) a mixer signal source coupled to said downconverter mixer and to said second upconverter mixer;

e) a frequency divider that couples said mixer signal source to said first upconverter mixer;

f) first and second bandpass filters which couple said signal source respectively to said downconverter mixer and said second upconverter mixer;

g) a microwave circuit board having first and second sides wherein at least portions of said downconverter and said upconverter are formed in microwave transmission lines on said first side and said first and second filters are formed with microwave transmission lines on said second side;

h) a plurality of via holes coupling said first and second filters through said circuit board to said downconverter and said upconverter respectively; and i) a frame carrying said circuit board and defining first and second cavities which respectively receive and isolate said first and second filters; and a cable for coupling said data interface module to said downconverter output port and said upconverter input port;

coherent signals from said mixer signal source thereby downconverting microwave signals received in a communication signal band from said antenna at said input/output port and double upconverting data signals received in a data signal band from said data interface module at said upconverter input port.

39. The transceiver of claim 38, further including:
a low-pass filter coupled to one of said downconverter output port and said upconverter input port for reception of a primary supply voltage; and
a power conditioning circuit coupled to said low pass filter for filtering and conversion of said primary supply voltage to at least one secondary supply voltage wherein operation of said transceiver is facilitated with said primary and secondary supply voltages.

40. The transceiver of claim 38, wherein said communication signal band is included in a multichannel multipoint distribution service (MMDS) frequency band of 2500–2686 MHz.

41. The transceiver of claim 38, wherein said mixer signal source has a frequency of 2278 MHz.

42. The transceiver of claim 38, wherein said data signal band is a frequency band of 5–45 MHz.

43. The transceiver of claim 38, wherein said upconverted signal band has a frequency of 2305–2360 MHz.

44. The transceiver of claim 38, wherein said upconverted signal band is included in a multichannel multipoint distribution service (MMDS) frequency band of 2500–2686 MHz.

45. The transceiver of claim 38, wherein said upconverted signal band is a multipoint distribution service (MDS) frequency band of 2150–2162 MHz.

46. The transceiver of claim 38, wherein:
said frequency downconverter further includes:
a low-noise amplifier and an rf bandpass filter serially coupled between said downconverter input and said downconverter mixer; and
an if amplifier and an if bandpass filter serially coupled between said downconverter mixer and said downconverter output port; and
said frequency upconverter includes:
an if amplifier and an if bandpass filter serially coupled between said upconverter input port and said first upconverter mixer;
an if amplifier and an if bandpass filter serially coupled between said first and said second upconverter mixers; and
an rf amplifier and an rf bandpass filter serially coupled between said second upconverter mixer and said upconverter output.

47. The system of claim 38, wherein said data interface module is a cable modem.

48. The transceiver of claim 38, wherein said diplexer includes:
a receive filter configured to pass microwave signals in said communication signal band from said input/output port to said downconverter input; and
a transmit filter configured to pass upconverted data signals in said upconverted signal band from said upconverter output to said input/output port.

49. The transceiver of claim 38, further including:
a microwave circuit board having first and second sides wherein at least portions of said downconverter and said upconverter are formed in microwave transmission lines on said first side and said diplexer is formed with microwave transmission lines on said second side;
a plurality of via holes coupling said diplexer through said circuit board to said downconverter and said upconverter; and
a frame carrying said circuit board and defining at least one cavity which receives and isolates at least one of the receive and transmit filters of said diplexer.

50. The transceiver of claim 49, wherein said microwave transmission lines are microstrip transmission lines.

* * * * *